Figure 1:
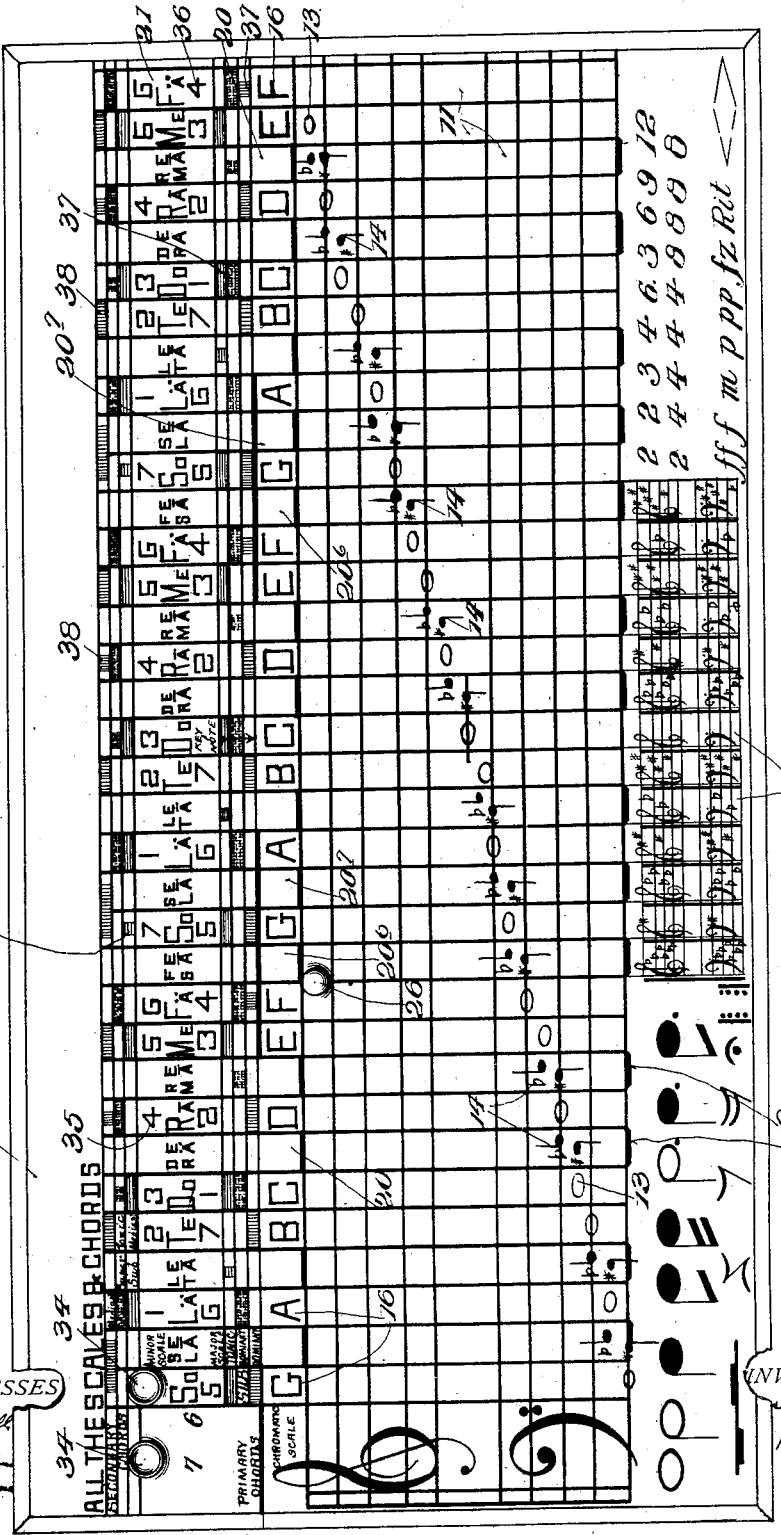

J. W. SCROGGS.
MUSICAL CHART.
APPLICATION FILED DEC. 28, 1912.

1,091,865.

Patented Mar. 31, 1914.
3 SHEETS—SHEET 1.

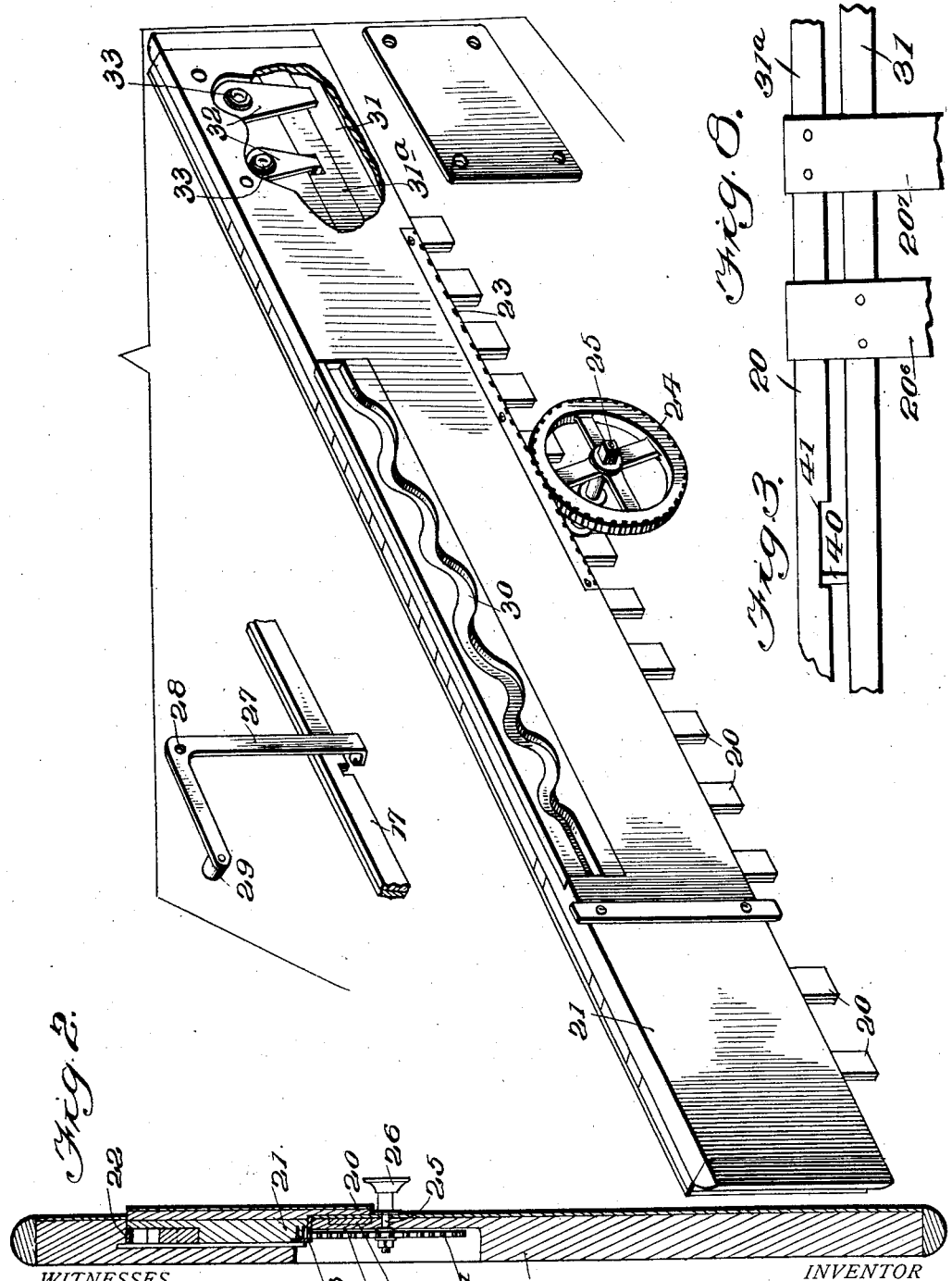

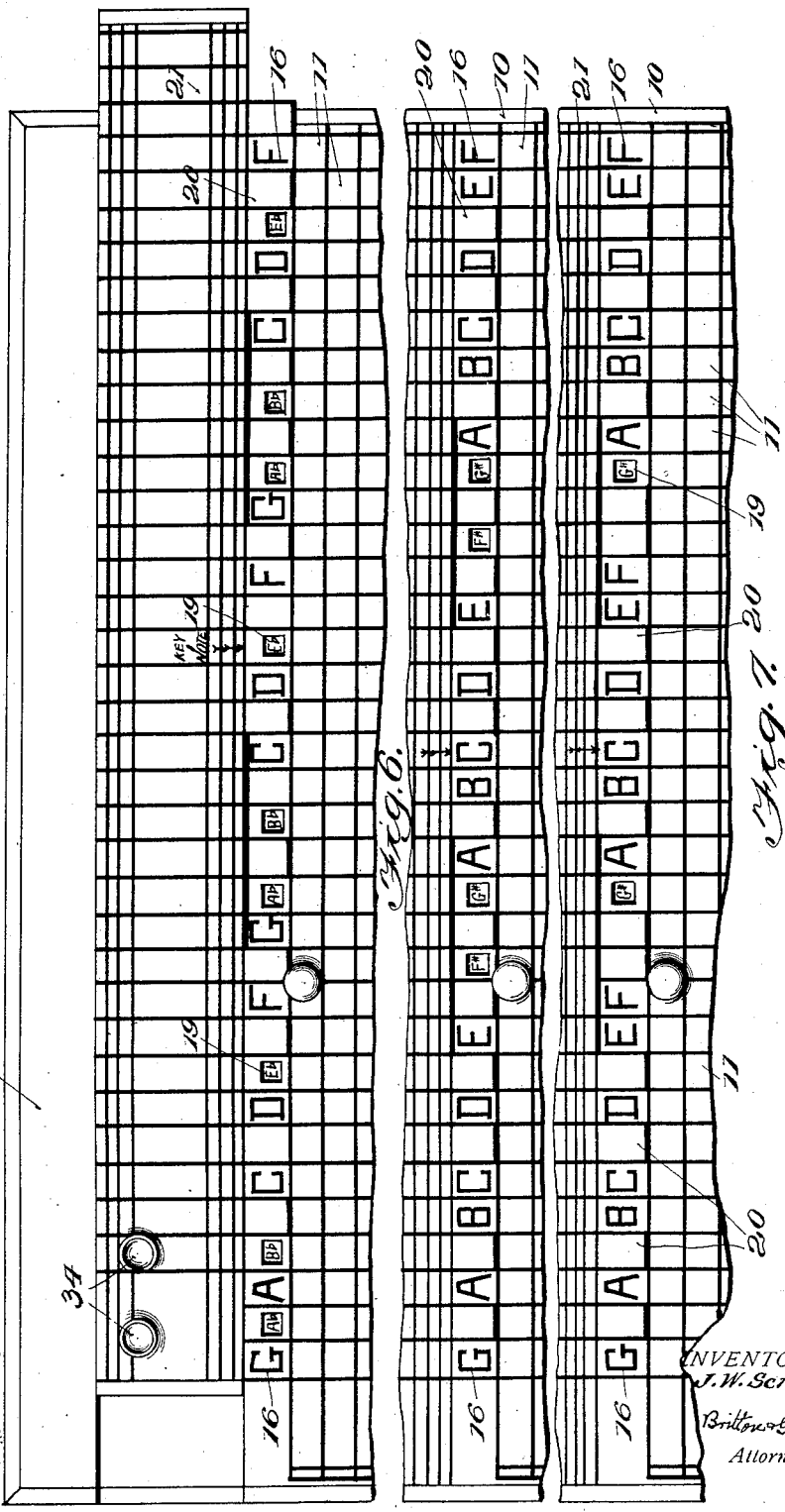

UNITED STATES PATENT OFFICE.

JOSEPH W. SCROGGS, OF KINGFISHER, OKLAHOMA.

MUSICAL CHART.

1,091,865.

Specification of Letters Patent.

Patented Mar. 31, 1914.

Application filed December 28, 1912. Serial No. 739,063.

*To all whom it may concern:*

Be it known that I, JOSEPH W. SCROGGS, a citizen of the United States, residing at Kingfisher, in the county of Kingfisher and State of Oklahoma, have invented certain new and useful Improvements in Musical Charts, of which the following is a specification.

This invention comprehends certain new and useful improvements in music charts designed particularly for use in aiding the student of music in self-instruction, as well as an aid to the teacher in imparting the underlying principles and precepts that constitute the foundation of an understanding of harmony and the structure of scales, and the invention has for its primary object a simple and efficient device of this character which will be a material aid both to teachers and scholars in studying harmony and in learning to play the piano or organ.

The invention has for a further object a simple music chart displaying thereon columns corresponding in relation to each other with a certain portion of the middle register of the keys of a piano, the black keys being graphically distinguished from the white, and means whereby, through the instrumentality of a slide and other correlated elements there may be displayed the required characters to indicate the notes of any desired scale.

A further object of the invention is a chart of this character embodying a slide so arranged that when in a position to indicate and expose the characters representing the keys of the scale of C natural it will cover spaces at which the intervening flats and sharps appear, and which will automatically expose such spaces, when moved to different predetermined positions so as to bring to view, in proper sequence, the said sharps and flats of the different scales, means being provided, including an automatically reciprocating bar, whereby when the slide is shifted to any position where its "key note" is in alinement with one of a series of key signatures arranged in order at the bottom of the columns, all of the notes of the scale for which that key signature stands will be brought to view, together with the exact name of each note.

A still further object of the invention is a music chart in which the slide contains in addition to the features hereinbefore enumerated a series of characters of contrasting colors representing the primary chords, another series representing the secondary chords, while between these two series are displayed the syllables used in solmization to denote the degrees of the chromatic scale, there being below said syllables a row of numerals indicating the major scale and above said syllables the numeral names of the relative minor scale.

The invention also has for its object, in a device of this kind, a slide provided with fingers normally covering certain spaces in which appear characters indicating the different tones of the chromatic scale, sundry of said fingers being movable at will whereby there will be exposed the spaces showing the keys of the harmonic or melodic minor scales relative to the corresponding major scale, means being provided whereby, without shifting the slide, the sixth of the natural minor scale may be changed from a major to a minor sixth, and the seventh of the natural minor scale from major to minor seventh, as desired. And the invention also aims to generally improve devices of this class, so as to render them more useful and universally applicable.

With these and other objects in view, as will more fully appear as the description proceeds, the invention consists in certain constructions, arrangements and combinations of parts that I shall hereinafter fully describe and claim.

For a full understanding of the invention, reference is to be had to the following description and accompanying drawings, in which—

Figure 1 is a face view of my improved musical chart; Fig. 2 is a transverse sectional view thereof; Fig. 3 is a fragmentary perspective view of some of the details hereinafter specifically referred to; Fig. 4 is a detail face view of a reciprocating bar employed and Figs. 5, 6, 7 and 8 are fragmentary views to illustrate different movements of the parts.

Corresponding and like parts are referred to in the following description and indicated in all the views of the accompanying drawings, by like reference characters.

Referring to the drawings, the numeral 10 designates the body of my improved music chart, the same being composed of a wood or any other suitable backing faced with linen or paper on which the different indicating characters are displayed. The face of the chart consists of a great staff of any predetermined compass transected by vertical columns 11, each of which represents a semitone and on the lower edge of which appear representations of the black keys of a piano, as indicated at 12. Within these columnar spaces 11 are displayed large open or whole notes 13 representing the normal degrees of the staff or the white keys of a piano, and small black or quarter notes 14 representing the black keys of a piano or the tones intermediate the tones represented by the open notes, as will be readily understood. Below the staff and collinear or in vertical alinement with sundry of the vertical columns 11 are the thirteen signatures of the keys, designated 15 as a whole. Above the staff the face of the chart contains, as indicated at 16, the letter names by which the degrees of the staff are designated together with the intermediate tones, comprising the chromatic scale, the words "Chromatic scale" being preferably displayed at the left of this row of letter names, as shown. The letter names of the normal degrees of the staff are, manifestly, shown in the columnar spaces, in which the corresponding open notes appear, and are printed directly on the face of the chart, but the letter names of the intermediate tones are printed on the face of a bar 17 mounted for a back and forth or reciprocating movement in a groove 18 formed in the body 10 immediately back of the facing thereof, and are arranged to show through openings 19 formed in said facing in the spaces between those in which the letter names of the normal degrees of the staff are displayed. This bar 17, with its connections and their function will be hereinafter more specifically described. Some of these letter names 16 are at all times concealed by fingers 20 which project from one edge of a slide 21 mounted for lateral movement in a groove 22 formed in the body 10, any means being provided, within the purview of my invention, for shifting said slide. In the present instance, for this purpose, I have shown the slide as provided on one edge with a rack 23 engaged by a pinion 24 carried by a shaft or spindle 25 journaled in the body 10, a finger piece or knob 26 being secured to the forwardly projecting end of said spindle, as clearly illustrated in the drawings. Manifestly, the rack is long enough to permit the slide to be moved, by and upon the turning of the knob 26, through at least the semitones of the thirteen signatures 15 at the bottom of the chart. The fingers 20 of the slide 21 are so spaced, as will at once be apparent by reference to the drawings, that they cover at all times part of the chromatic scale, and they are so arranged, as will now be described, that they will reveal between them only the notes of a desired scale.

The bar 17, before mentioned, and on the face of which are displayed the letter names of the intermediate tones, i. e. sharps and flats in juxtaposition to each other, is connected to one arm of a bell-crank lever 27 fulcrumed at its elbow, as at 28, in the grooved face of the body 10, the other arm of said bell-crank carrying a roller 29 which works in an undulatory cam groove or track 30 formed in the rear side of the slide 21. Consequently, as will be readily understood, when the slide 21 is shifted, a reciprocating or vibratory movement will be imparted to the bar 17, whereby as the fingers 20 expose those spaces in the vertical columns where the openings 19 occur, the proper letter names or characters, sharps or flats, will show through said openings to complete the required keys or tones of the desired scale.

While the majority of the fingers 20 are fixed relative to the slide 21, some of them (two pairs in the present embodiment of the invention) are movable independently of any movement of the slide itself, whereby the "sixth" or "seventh" of any minor scale may be changed from major sixth or major seventh to minor sixth or minor seventh, as desired. To accomplish this result, one pair of these independently movable fingers—designated $20^6$ for the purpose of distinction, is connected to a strip 31 movable in the direction of its length in the slide 21, and the other pair, designated $20^7$, is connected to a corresponding strip $31^a$ also movable in the direction of its length in the said slide. Each of these strips is connected to a crank 32, said cranks being disposed on the rear side of the slide 21 and connected to separate spindles 33 journaled in said slide, finger pieces or knobs 34 being connected to the forwardly projecting ends of said spindles whereby the strips may be conveniently manipulated. It will thus be understood that when the slide had been shifted to the desired point, a further adjustment in the relative positions of the fingers may be effected, so as to change the natural minor scale to the harmonic or melodic minor scale. The said natural minor scale is indicated, as regards its relative major, by a row of figures 35 displayed near the upper edge of the slide 21; the corresponding major scale is indicated by a row of figures 36 displayed on the slide near the lower edge thereof, while between said two rows of figures the syllable names of the degrees of the chromatic scale are shown. Below said syllable names appear color spots, as at 37, representing the primary chords,—blue, the notes of the tonic chord; yellow, the sub-dominant; and red, the dominant. Above said syllable names appear color spots—38 representing the secondary chords,—blue, the sub-mediant; yellow, the super-tonic; and red, the mediant. The square spots 39 represent the heptachords.

At the left-hand and right-hand lower corners of the chart may appear any instructive signs, such as the values of the different notes, the different conventional tempos, and expression marks.

From the foregoing description, in connection with the accompanying drawings, the operation of my improved music chart will be apparent. In order that the operation may be fully understood, I will give the following examples of its use: For instance let it be supposed that it is desired to study the scale of one flat. To do this, the student will first find that signature at the bottom of the chart and move the slide until the key note at the middle of the slide is in its column. The letter names of the notes used in that scale then appear between the fingers 20, as for example F G A B flat, C D E F and so on. By comparing the intervals of the major scale as shown by the larger, figures only with the notes of the staff the reasons for using the one flat appear at once. All of the primary and secondary chords of the scale of F, or one flat, are also shown. To study the scale of three flats, that signature is found at the bottom of the chart, and the slide 21 is moved until the key note is in its column. The letter names of the notes used in that scale then appear between the fingers 20, namely E flat, F, G, A flat; B flat, C and D. To study the scale of four sharps, for example, the slide 21 should be moved to the column of four sharps, or scale of E. The reciprocating device will change E flat to D sharp, and A flat to G sharp, and C sharp and F sharp also appear. In this way all of the scales from G flat below to F sharp above middle C may be shown.

It is to be particularly noted that in the use of my device the flats and sharps are not shown when the parts are adjusted to study any scale, and hence the student is not called upon to determine from his or her knowledge of music which is to be used. For example, with the use of my invention, when the parts are adjusted to study the scale of F only B flat is shown, while in the scale of B the same note is marked A sharp. Thus the operation is simplified, and the study of harmony and the structure of scales greatly facilitated.

As best indicated in Fig. 8, the strip which regulates the seventh of the minor scale is provided with a stop 40, which works in a notch or recess 41 in the other slide or strip, so that when the first-named strip moves to the right the second-named moves to the left each will carry the other with it. The reason for this is that the major sixth is never used in any scale with the minor seventh. Consequently the performer is enabled to change from the natural to the melodic minor by turning on one knob,—the seventh to change from the melodic to the natural minor by turning the other knob. Since the major sixth is never used without the major seventh the former by this construction cannot be made without the latter.

While the accompanying drawings illustrate what I believe to be the preferred embodiment of my invention, it is to be understood that the invention is not limited thereto, but that various changes may be made in the construction, arrangement and proportions of the chart without departing from the scope of the invention as defined in the appended claims.

Having thus described my invention what I claim as new and desire to secure by Letters Patent is:

1. A music chart, comprising a body displaying thereon letter names designating the whole and intermediate tones of the chromatic scale, a slide movably mounted on the body and provided with fingers arranged in predetermined order to cover and conceal certain of said letter names and to expose others, and means operatable by and upon the movement of said slide upon the body for automatically bringing to view other letter names to fill in all of the intermediate tones necessary to complete the tones of any desired scale.

2. A music chart, including a body displaying thereon letter names arranged in predetermined order to designate the whole and intermediate tones of the chromatic scale, some of said letter names being fixed on the face of the body in spaced relation to each other and the face of the body being formed with openings in the intervening spaces between said fixed letter names, the letter names designating the intermediate tones of the scale, flats or sharps, being movable into and out of registry with said openings, a slide mounted on the body and provided with fingers extending over and arranged to conceal sundry of said letter names and to expose others, and means operable by and upon the movement of the slide for automatically bringing into view the letter names of the intermediate tones of the different scales, according to the position in which the slide is moved.

3. A music chart, including a body displaying on its face letter names designating the whole and intermediate tones of the chromatic scale and displaying vertical columns at the lower ends of sundry of which are displayed the signatures of the different keys or scales, a slide movable on the body portion and provided intermediate of its ends with a designating character or key note, said slide being provided with a plurality of fingers extending over and arranged to conceal sundry of said letter names and to expose others, a bar slidingly mounted on the body in alinement with the row of letter names designating the whole tones of the chromatic scale, the intermediate tones of said scale being designated by letter names which are carried by said bar, the face of the body being formed with openings through which said letter names of the intermediate tones are designed to be seen, and means whereby said bar will be automatically shifted back and forth upon the movement of the slide to bring into view at said openings the intermediate tones, sharps or flats, of any scale with which the key note of the slide is brought into collinear relation.

4. A music chart, including a body displaying on its face in fixed relation thereto and in a horizontal row letter names designating the whole tones of the chromatic scale, spaces being left between certain of said letter names and the face of the body being formed with openings in said spaces, a bar slidingly mounted on the body back of said row of letter names, letter names designating the intermediate tones of the chromatic scale, flats and sharps arranged in pairs in juxtaposition to each other and displayed on the face of said bar in registry with said openings, a slide mounted on the body and provided with fingers extending over and arranged to conceal sundry of said letter names, and an operative connection between said slide and bar whereby when a certain portion of said slide is brought to a predetermined point, the bar will be shifted to a position where it will show in regular order all of the whole and intermediate tones of a scale.

5. A music chart, including a body displaying on its face in fixed relation thereto and in a horizontal row letter names designating the whole tones of the chromatic scale, spaces being left between certain of said letter names and the face of the body being formed with openings in said spaces, a bar slidingly mounted on the body back of said row of letter names, letter names designating the intermediate tones of the chromatic scale, flats and sharps arranged in pairs in juxtaposition to each other and displayed on the face of said bar in registry with said openings, a slide mounted on the body and provided with fingers extending over and arranged to conceal sundry of said letter names, and an operative connection between said slide and bar whereby when a certain portion of said slide is brought to a predetermined point, the bar will be shifted to a position where it will show in regular order all of the whole and intermediate tones of a scale, the face of the board displaying vertical columns at the top of which the letter names are displayed and at the bottom of the same of which are the key signatures with which said certain portion of the slide is designed to be brought into collinear relation to display the tones of the desired scale.

6. A music chart, including a body displaying a plurality of columnar spaces at the bottom of some of which are key signatures and at the top of some of which in spaced relation to each other are displayed letter names designating the whole tones of the chromatic scale, the face of the board being formed in spaces intervening the spaces where the said letter names are displayed with openings, a bar slidingly mounted on the body back of said openings and having displayed on the face of the bar letter names designating the semitones of the chromatic scale, flats or sharps, a slide mounted on the body and provided with fingers projecting over and arranged to conceal sundry of said letter names and to expose others, said slide being provided with a character designating a key note designed to be brought into collinear relation with the different key signatures before mentioned, the slide being formed on its rear face with an undulatory cam groove, a bell-crank fulcrumed on the body and pivotally connected by one of its arms to the bar, and an operative engagement between the other arm of the bell-crank and the cam groove, the letter names carried by the bar being designed to register with the said openings.

In testimony whereof I affix my signature in presence of two witnesses.

JOSEPH W. SCROGGS.

Witnesses:
NORMAN L. WILLEY,
HOWARD A. DETTMERS.